United States Patent [19]

Jones

[11] 3,817,331

[45] June 18, 1974

[54] WATERFLOODING PROCESS

[75] Inventor: Loyd W. Jones, Tulsa, Okla.

[73] Assignee: Amoco Production Company, Tulsa, Okla.

[22] Filed: Dec. 22, 1972

[21] Appl. No.: 317,553

[52] U.S. Cl. .............................. 166/275, 166/274
[51] Int. Cl. ............................................. E21b 43/22
[58] Field of Search ........................... 166/273–275, 166/252

[56] References Cited
UNITED STATES PATENTS

| | | | |
|---|---|---|---|
| 3,386,506 | 6/1968 | Quance | 166/273 |
| 3,460,623 | 8/1969 | Leach | 166/273 |
| 3,529,668 | 9/1970 | Bernard | 166/273 |
| 3,599,715 | 8/1971 | Roszelle | 166/273 |
| 3,599,716 | 8/1971 | Thompson | 166/273 |
| 3,599,717 | 8/1971 | McMillen | 166/273 |
| 3,653,440 | 4/1972 | Reisberg | 166/273 |
| 3,759,325 | 9/1973 | Gogarty | 166/273 |

*Primary Examiner*—Stephen J. Novosad
*Attorney, Agent, or Firm*—Paul F. Hawley; Arthur McIlroy

[57] ABSTRACT

One of the difficulties in present methods for using surfactants to improve waterflood efficiency is that their movement through the rock is slow relative to the rate of water movement. As a result, these agents do not remain at the flood front. In addition, the bank of connate water ahead of the flood front prevents the surfactants from reaching the oil-water interface. The present invention overcomes this difficulty by injecting gas in proper volume to move through the injected and connate water bank to the oil-water interface, carrying the surfactant with it. This gas purging method is also considered to be of value in collecting and producing dispersed oil associated with and left by other surfactants, wetting agents and oil solvents.

The present invention relates to a method for the recovery of oil from underground deposits thereof. More particularly, it is concerned with an improved waterflooding technique for oil recovery.

4 Claims, No Drawings

WATERFLOODING PROCESS

BACKGROUND OF THE INVENTION

Oil has been produced by means of waterflooding for many years. It has been a popular means of recovering oil primarily because of the favorable economics and the fact that the oil recoverable by this method can be produced at a relatively rapid rate. Waterflooding, however, left behind as much as one-third to one-half of the oil remaining after primary depletion of the reservoir. This was primarily due to the fact that because of the relatively high interfacial tension at the oil-water interface, the water alone is not efficient in displacing the oil and usually bypasses much of the oil.

In an effort to overcome the tendency of the water to bypass the oil bank and break through into the producing wells a number of proposals have been made to modify the behavior of the injected water bank so as to improve its sweep efficiency. One of the approaches to accomplishing this has been to create a foam bank directly behind the oil with the thought that the presence of the foam would aid in controlling the mobility of the water. Procedures of this general type are disclosed in U.S. Pat. Nos. 2,866,507, 3,207,218 and 3,599,715. While in theory such procedures would seem to be sound, it has been my observation that propagation of foams through a formation is exceedingly slow and difficult to sustain. When a solution containing a water-soluble detergent or wetting agent which tends to stabilize foam is displaced through reservoir rock, the movement of the foam through the rock is slow relative to the rate of water movement. As a result, the surfactant does not remain at the flood front (oil-water interface), but instead largely lags behind. Even if such surfactants were capable of keeping up with the injected water, the accumulation of connate water in front of the injected water prevents their reaching the interface between the main oil bank and the displacing water. Also, substantial amounts of the surfactants are adsorbed onto the rock and thus effectively lost from the flooding system.

SUMMARY OF THE INVENTION

In carrying out the process of my invention, a solution of a substantially non-foam stabilizing surfactant is injected into the formation followed by flood water and the surfactants are carried along and kept at the front of the flood water by injection of a highly mobile gas phase. Production of a stable foam which prevents the gas from moving faster than the water would defeat this process. Consequently, the gas-water volume ratio preferably should be kept low — typically 1:9 to 1:1 — and non-foaming surfactants used to avoid stable foam production. Surfactant molecules in general are characterized by having both hydrophilic and lipophilic ends and the molecules concentrate at the interface between immiscible fluids such as water/gas or water/oil. Both surfactants and oil droplets dispersed in water attach to gas bubbles and move with them. By this means the surfactant and dispersed oil are swept to the flood front. The gas, such as, for example, air, natural gas, $CO_2$, etc., is introduced either continuously or alternately with slugs of flood water. This provides the condition — to be discussed in greater detail below — whereby the oil is moved more efficiently through the reservoir and into the producing wells. Ideally, the gas should be injected in a manner favorable to dispersion or small bubble formation. The gas can be compressed into solution followed by subsequent expansion to the bubble point as the solution moves through the rock. Mechanical dispersion aids such as agitators can be employed. The gas can be forced into the bottom of the injection well through tubing fitted with a fine mesh screen on the bottom. Flood water moving down the outside of the tubing takes up the gas emerging from the screen as fine bubbles and the mixture moves into the formation. Numerous procedures exist for injecting the gas and water into the formation. For example, water could be injected in the upper part of the oil-bearing rock while gas is being introduced through a long fracture at the bottom of the formation. The gas then would rise into the water and, having a high mobility, moves toward the producing well. In some instances, it might be advantageous to put the water in at an injection well and inject gas at the producing well through a long fracture extending along the bottom of the formation. The gas should then rise and sweep back into the liquids to the producing well.

The surfactants I use are considered to be essentially incapable of forming highly stable foams. Surfactants that are normally good foaming agents are not considered to be within the scope of my invention. In the process of my invention, the gas phase should have a relatively high mobility, and conditions should be provided that favor the free forward movement through the water containing the surfactant. This is for the reason that the gas sweeps the surfactant to the flood front or the front of the water bank so that it is made available to and concentrates at the oil-water interface. In this way, the adsorptive forces that normally cause the surfactant to lag behind and become attached to the reservoir rock are counteracted. Even non-foaming surfactants have a strong affinity for the surfaces of gas bubbles. The gas bubbles moving through the water collect the surfactant and carry it to the water-oil interface at the flood front where the concentration of surfactant lowers the water-oil interfacial tension and at that point produces a blending of water and oil. The water-oil blend (containing the surfactant and preferably a co-surfactant such as isopropyl alcohol, ethoxylated n-hexanol or other known cosurfactants) is a micellar solution or dispersion, thus providing the condition of near miscibility responsible for increased oil displacement efficiency.

One advantage accruing from my process is that less total surfactant is required since the active material is kept concentrated at the water-oil interface where it is needed. The injected gas serves primarily as a vehicle to carry the surfactant forward at a faster rate than can be achieved otherwise. Behind the water-oil front, we have a condition of mobile gas bubbles moving along with the water (but at a faster rate). This does not produce a foam in the ordinary sense. The surfactant and the mechanical condition of fluid movement through the rock tend to keep the gas bubbles dispersed and small. Some coalescence of the gas bubbles into temporary pockets is not harmful since the pockets tend to dynamically form and redisperse and the over-all movement of the gas phase is not greatly impeded. On encountering the oil, the surfactant distributes itself between the water, oil and gas phases. Movement of the mobile gas through the oil-water interface produces a mixing action. As the gas moves on into the oil, it tends to sweep the surfactant and some associated water with it. This creates at the trailing edge of the oil an oil-external micellar system which is most efficient for oil displacement.

If the gas employed is soluble in the oil, such as methane or $CO_2$, it moves into and dissolves in the oil. This tends to create a second advantageous condition of rendering the oil less viscous and more mobile. If the oil mobility can be increased to a sufficient extent (relative to the gas-water mixture and the water-oil dispersion in the mixing zone), it should not be necessary to use mobility decreasing agents in the driving water.

One of the advantages of using surfactants that are normally not considered to be good foaming agents is that they are generally better wetting agents. Thus, in the case of oxyethylated polypropylene glycols ranging in molecular weight from about 1,000 to 3,250, maximum wetting properties are achieved with ethoxylated glycols containing not more than about 20 percent ethylene oxide while their foaming properties decrease. These materials are sold by the Wyandotte Chemical Company under the trademark "Pluronics." This effect is also observed with other glycol-based surfactants — for example, the Surfynols of AIRCO Chemicals and Plastics Company. These materials are generally classified as ditertiary acetylenic glycols. Typical of such materials are 3,6-dimethyl-4-octyne-3,6-diol and 2,4,7,9-tetramethyl-5-decyne-4, 7-diol. The higher molecular weight members of both the Pluronics and Surfynols have limited water solubility at low ethylene oxide content. However, this problem can be minimized by using mixtures of oxyethoxylated and unreacted glycols for high surface activity and minimum foam with adequate solubility. There is also evidence that while these classes of surfactants are very powerful wetting agents, they do not exhibit the relatively permanent type adsorption to solids characteristic of some less effective wetting agents, which of course is an additional advantage of their use in waterflooding applications. In addition to the above-named surfactants, I may use the alkali metal petroleum sulfonates in the process of my invention. However, when such surfactants are employed, I prefer to use them in combination with a suitable cosurfactant such as isopropyl alcohol or a glycol ether such as a two to six mol ethylene oxide adduct of a six to eight carbon atom aliphatic alcohol, such as, for example, hexanol and octanol, which very greatly reduces the foaming tendency of the sulfonate. In addition, I may combine the sulfonates with the Pluronics or with both the Pluronics and the known cosurfactants or alcohols to provide a non-foaming but powerful surfactant mixture. Small amounts of the Surfynols can be added to any of the possible mixtures for foam suppression.

Although the glycol-base surfactants and combinations of sulfonates with glycol ether cosurfactants are typical of the preferred types of relatively non-foaming water-soluble surfactants, the process of my invention is not restricted to such materials. Gas sweeping can improve waterflood oil recovery even when oil-soluble surfactants are present. Such surfactants may be added to an injected oil bank, for example. This procedure is considered particularly attractive since a continuous oil bank is re-established after the manner described by U.S. Pat. No. 3,006,411. By incorporating oil-soluble surface-active agents (poor foamers) in the injected oil and continuously or intermittently sweeping the drive flood water with gas, the injected oil bank is kept continuous and not allowed to become discontinuous and thus ineffective. The oil-soluble surfactants and surfactant-cosurfactant blends suitable for use in my process are exemplified by the compounds listed in U.S. Pat. Nos. 3,126,952 and 3,308,068. The surfactants in the injected oil bank can also be natural agents present in certain crude oils, for example, a quantity of selected crude oil such as that produced in Hastings West Field, Texas, can be injected and driven by water containing sodium hydroxide. Reaction of the caustic and natural agents such as cresols produce surface-active agents that drastically lower interfacial tension. The interfacial tension between the two phases provides increased oil displacement efficiency as long as the injected oil moves as a continuous bank. By continuously or intermittently sweeping the driving water with injected gas, the oil bank can be kept intact and continuous. Oil droplets which become detached from the main bank and are left behind are picked up and moved forward with the relatively fast moving gas. As the gas moves through and past the oil bank, some dispersion of oil may occur at the front of the bank. However, this is not considered harmful.

The amount of surfactant employed may vary widely. However, in the majority of cases, not more than 10 percent of the reservoir pore volume is needed using dilute, e.g., 1 percent, solutions. Smaller quantities of surfactant solutions can be used where the concentration of surfactant therein is higher, e.g., 10 percent. Actually, however, the amount of surfactant solution and the concentration of surfactant therein are not too important insofar as my invention is concerned. The principal advantage thereof is the fact that given a fixed volume of surfactant solution, the process of my invention enables one to use it more effectively than is possible with prior methods, as demonstrated in the example below.

DESCRIPTION OF A SPECIFIC EMBODIMENT

The process of my invention is further illustrated by reference to the following specific example.

EXAMPLE

A vertically positioned, clear plastic (Lucite) tube 66¾ inches in length and having an I.D. of 1.47 inch was packed with Ottawa sand (5–70 mesh). The packed core had a permeability to water of 21 darcies. Initially, this core was saturated with 0.2 N NaCl, then flooded with filtered crude oil from the Second Wall Creek formation, Salt Creek Field, Wyoming, to give a connate water saturation of 17 percent. Thereafter, the core was waterflooded to give a residual oil saturation of 17 percent. In each of the 3 runs listed below, a micellar solution consisting essentially of about 3 percent sodium petroleum sulfonate, 2 percent isopropyl alcohol and 95 percent 0.2 N sodium chloride brine was employed as the solvent. Each run was continued until no more oil was produced from the upper end of the core. This solvent slug was used in a concentration corresponding to about 5 percent of the core pore volume and was forced through the core under the conditions noted in the "Remarks" below.

| Run No. | Liquid Injection Rate (cc/hr) | Gas/Liquid Ratio | % Oil Rec. | Inches Cleaned | Remarks |
|---|---|---|---|---|---|
| 1 | 12.8 | 1:1 at atm. | 89 | 25 | $CO_2$ was bubbled into water under pressure of 13 psi until water became saturated. Subsequent reduction of pressure released water and $CO_2$ in equal volumes. |
| 2 | 12.8 | 0 | 83.8 | 18 | No $CO_2$ was present; otherwise the conditions were the same as in Run No. 1. |
| 3 | 12.8 | 0 | 80 | 20 | No gas present in the drive fluid but drive water contained sufficient of the polysaccharide B-1459 (see U.S. Pat. No. 3,373,810) to give a concentration in the drive water of 750 ppm. |

From the above data it will be noted that the process of the present invention exemplified by Run No. 1 removed oil from the first 25 inches of the core, whereas procedures not using gas in the drive water but otherwise similar to Run No. 1 were able to remove oil from not more than the first 20 inches of the core. Likewise, the percentage of oil recovered amounted to an improvement of about 6–9 percent using the process of my invention as opposed to essentially identical procedures omitting the use of gas in the drive water.

Another aspect of the process of my invention involves entrainment of dispersed oil droplets by gas bubbles. Surfactants, either natural, injected, or those formed in place, may cause dispersion of oil back into the water as the flood front advances. Such discontinuous oil is relatively immobile in the advancing water. By sweeping the water with gas as discussed above, it is possible to collect the oil and move it forward in a manner analogous to the froth flotation technique. This idea was roughly tested in a laboratory experiment in which a sand-packed column was water-flooded following injection of an oil bank containing 2 Vol. percent lecithin and 2 Vol. percent hexanol. At water breakthrough, only 6.2 percent of the original oil in place was left unrecovered. Continued water injection normally produces no additional oil after breakthrough. In this particular test, however, air was injected at the bottom of the column and additional oil was recovered. This amounted to 45 percent of the oil left after waterflooding. This supports the view that the use of gas purging is not limited to water soluble surfactants, but should be of value for collecting and producing dispersed oil associated with and left by other surfactants, wetting agents or solvents, such as alcohols.

I claim:
1. A process for the recovery of oil from an underground reservoir thereof, said reservoir being penetrated by an injection well and a producing well, wherein said oil is forced toward said producing well by displacing a water bank through said reservoir, the improvement which comprises maintaining an essentially non-foaming surfactant at the interface formed between the said water bank and said oil whereby the interfacial tension at said interface is substantially lowered by
 1. injecting a solution of a non-foaming surfactant in an amount not to exceed about 10% of the reservoir pore volume followed by flood water,
 2. forming bubbles in said flood water by contacting the latter with a gas,
 3. continuing the introduction of said gas into said reservoir to transport said bubbles through said flood water to said producing well whereby said surfactant collects on said bubbles and is carried thereon to said interface, and
 4. recovering oil from said producing well.

2. The process of claim 1 wherein said gas is dissolved in the floodwater at a pressure greater than the reservoir pressure so that said gas comes out of solution within the reservoir as small dispersed bubbles.

3. The process of claim 1 in which the surfactant is a glycol ether consisting of a two to six mol ethylene oxide adduct of a six to eight carbon atom aliphatic alcohol.

4. The process of claim 1 in which the surfactant employed is a ditertiary acetylenic glycol.

* * * * *